INVENTOR
Derek Colin Tolley

Oct. 29, 1968   D. C. TOLLEY   3,407,572
BAG TYPE FILTER APPARATUS AND CLEANING MEANS THEREFOR
Filed March 7, 1967   2 Sheets-Sheet 2

INVENTOR
Derek Colin Tolley

United States Patent Office

3,407,572
Patented Oct. 29, 1968

3,407,572
BAG TYPE FILTER APPARATUS AND CLEANING MEANS THEREFOR
Derek Colin Tolley, Highley, England, assignor to National-Standard Company Limited, Kidderminster, Worcestershire, England, a British company
Filed Mar. 7, 1967, Ser. No. 630,779
Claims priority, application Great Britain, Mar. 7, 1966, 9,823/66
1 Claim. (Cl. 55—283)

ABSTRACT OF THE DISCLOSURE

A gas filtering apparatus employing a filter unit of the kind comprising a tubular filtering wall composed of helically disposed flexible wires or other filaments providing between them filtering pores, at least some of the wires or filaments being bodily movable relative to each other to cause a variation in the diameter of the filtering wall with a corresponding variation in the length of the filtering wall, in which periodically a substantially axially directed force causes a variation in the diameter of the filtering wall.

---

Figure 1:
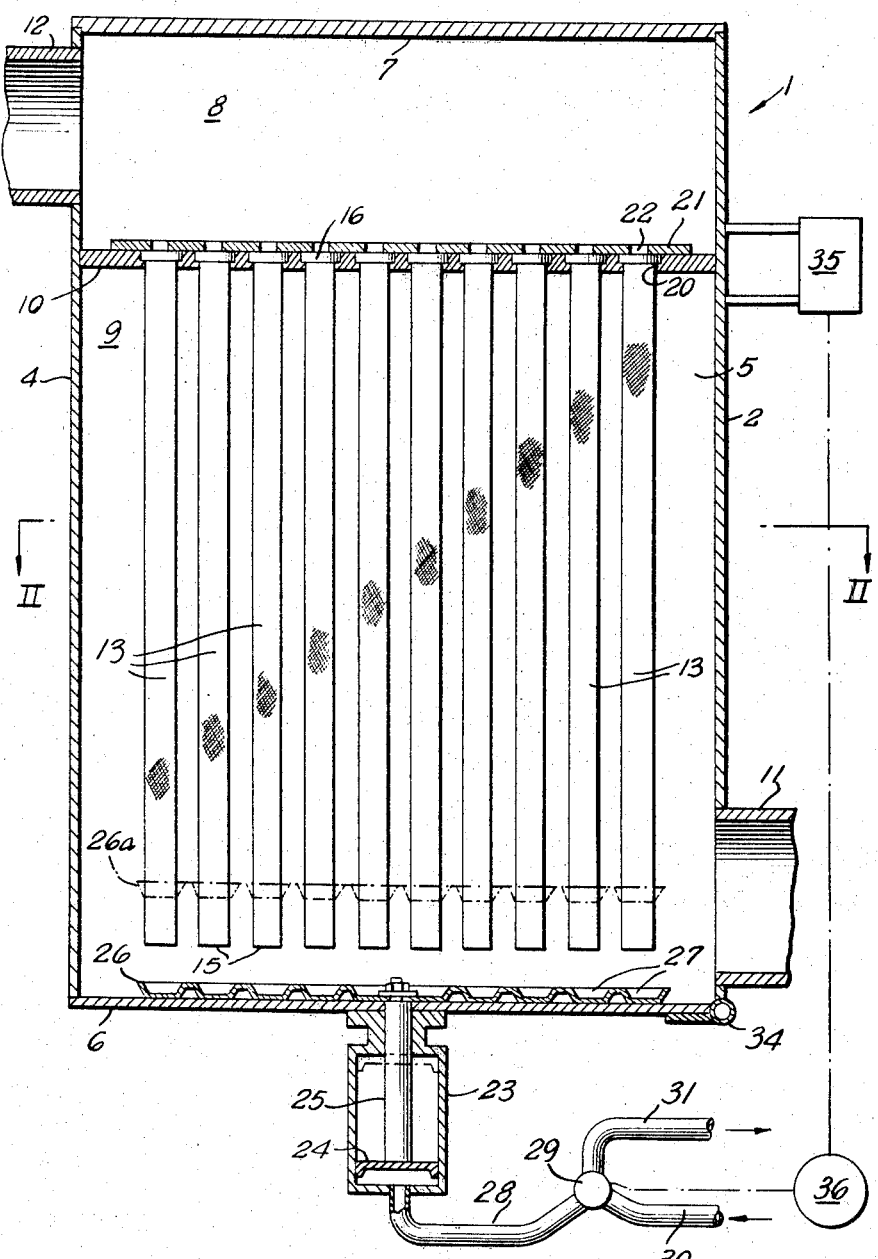

This invention relates to a gas filtering apparatus for, filtering gases employing a filter unit of the kind comprising a tubular filtering wall composed of helically disposed flexible wires or other filaments providing between them filtering pores, at least some of the wires or filaments being bodily movable relative to each other to increase or decrease the diameter of the filtering wall with a corresponding decrease or increase, respectively, in the length of the filtering wall.

It has already been proposed in British Patent No. 942,492 to employ filter units of the kind referred to, made from wire, in a filter of the pressure type wherein a pressure differential in a liquid being filtered is maintained at opposite sides of the filtering wall. Said specification describes the employment of such a filter for the filtration of a contaminated liquid containing a filter aid, for example diatomaceous earth. The liquid is caused to flow through the filtering wall into the interior of the filter unit by maintaining a higher pressure in the liquid outside the filter unit than inside the unit. In time a layer of the filter aid mixed with the contaminant builds up on the outwardly facing surface of the filtering wall and, in order to remove this layer, liquid is forced in the opposite direction through the filtering wall by reversing the direction of the pressure differential on the two sides of the wall. This results in an increase in the diameter of the filtering wall, with a corresponding decrease in the length of the filter unit, and consequently the layer of contamintaed filter aid is dislodged from the filtering wall and falls away from the filter unit.

While the above described filter operates very satisfactorily for the filtration of liquids, it cannot be used in the same way for filtering gases. The reason for this is that it has not proved possible to achieved any significant variation in the diameter of the filter unit by reversing the direction of gas flow through the filter. Consequently, when a filter comprising a filter unit of the kind referred to is employed to filter a gas it is necessary, as in the case of filters comprising other forms of filter units, to replace the filter unit when it becomes clogged or to remove the filter unit periodically for cleaning.

The present invention provides an apparatus for filtering a gas employing a filter unit of the kind referred to which can be operated for long periods of time without the need for replacing the filter unit or removing it for cleaning.

According to the invention an apparatus for filtering a gas employing a filter unit of the kind referred to comprises an apparatus for applying to the unit periodically a substantially axially directed force for the purpose of causing a variation in the diameter of the filtering wall.

In using the apparatus according to the invention for filtering a dust-laden gas, the latter may be passed through the filtering wall of the unit in the direction towards the interior of the unit. A layer of dust then builds up on the outwardly facing surface of the filtering wall and the pressure drop between the gas outside the filter unit and that inside the unit gradually increases. When this pressure drop reaches an unacceptably high value an axially directed force is applied to the filter unit to effect either a reduction in length of the filtering wall followed by restoration substantially to its original length, or an increase in length of the wall followed by restoration substantially to its original length. The resulting changes in diameter of the filtering wall cause the layer of dust to be dislodged and fall away from the filter unit so that the unit is in condition to resume the filtering process. If desired, the pressure drop through the filtering wall may be monitored by any suitable pressure measuring device which is arranged to produce a signal when said pressure drop reaches an unacceptably high value. The signal may give a visible or audible warning to advise an attendant that it is necesary to apply said axially directed force to the filter unit. Alternatively, said signal may be used to control means for automatically subjected the filter unit to said axially directed force.

Preferably, the flow of gas through the filter unit is stopped while the latter is subjected to the substantially axially directed force.

It will, of course, be appreciated that in using the apparatus of the invention the gas may be caused to flow outwardly through the filtering wall from the interior of the unit.

According to a further aspect of the invention a filter unit of the kind referred to comprises means for applying a substantially axially directed force to the filter unit for the purpose of varying the length of the filtering wall.

A filter unit in accordance with the invention may be supported at one end or at both ends of the filtering wall. If the unit is supported at one end, we prefer to arrange the unit with its longitudinal axis substantially vertical and to have the lower end of the tubular filtering wall closed and its upper end open, the unit being supported at its open upper end. Variations in the length of the filtering wall may then be effected by vertical displacement of the closed lower end of the filter unit. Such movement of the lower end of the unit may be achieved in many ways. For example, spring means may be provided to bias the lower end of the unit in one axial direction of the filtering wall against a stop and then remotely-controlled means may be provided for moving the lower end of the unit a short distance in opposition to the spring bias. The spring means may take the form of a helical spring disposed inside the filter unit with its axis coinciding with the axis of the filtering wall. The remotely-controlled means may take the form of an electromagnet arranged when energized, to attract an armature secured to the lower end of the unit. Alternatively, the remotely-controlled means may comprise a reciprocable plate or a cam arranged to displace the lower end of the unit or a cable chain or the like flexible member connected to the lower end of the unit by means of which a substantially axially directed pull may be exerted on the lower end of the unit. Again, the lower end of the filter unit may be moved positively in both directions by a crank mechanism. In this case the provision of a spring biassing means for the lower end of the unit would not be necessary.

If the filter unit is open at both ends of the filtering wall it may be supported at both ends and provision may then be made for causing relative movement of the supports in the axial direction of the filtering wall for the purpose of varying the length of the latter. Here, again, we prefer to arrange the filter unit with its longitudinal axis vertical, but if desired the longitudinal axis may be arranged horizontally or inclined at any angle to the horizontal.

The filter unit may have its filtering wall formed of a plurality of groups of helically disposed wires or other filaments of small diameter braided so that the wires or filaments of one group are disposed in angular or crisscross relation to the wires or filaments of the other groups, substantially as described in British Patent No. 942,492.

The invention also includes a filter comprising one or more filter units in accordance with the invention.

According to this aspect of the invention a gas filter comprises a container, an inlet opening in the container for admission of gas to be filtered, an outlet opening in the container for the withdrawal of filtered gas, means within the container constraining the gas to flow from the inlet opening to the outlet opening through at least one filter unit of the kind comprising a tubular filtering wall composed of helically disposed flexible wires or other filaments providing between them filtering pores, at least some of the wires or filaments being bodily movable relative to each other to increase or decrease the diameter of the filtering wall with a corresponding decrease or increase, respectively, in the length of the filtering wall, and means for applying a substantially axially directed force to the filter unit for the purpose of varying the length of the filtering wall.

Figure 2:
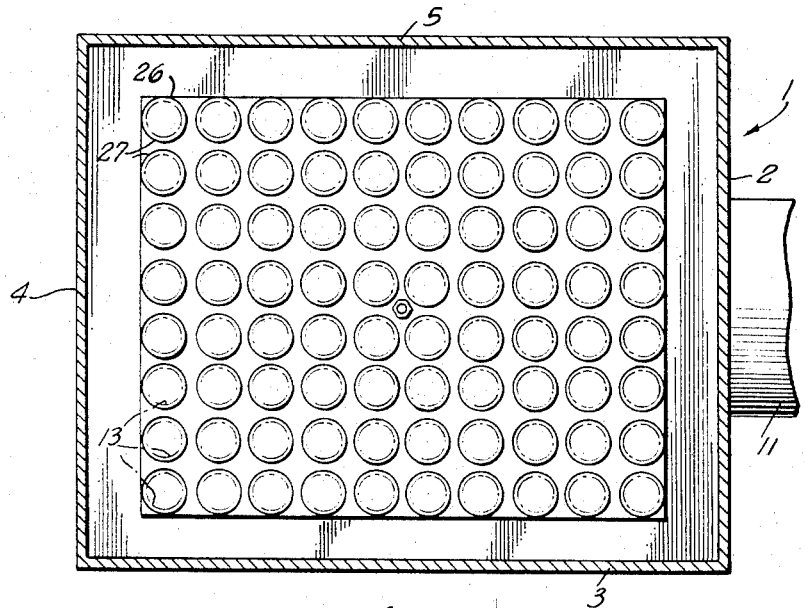
Figure 3:
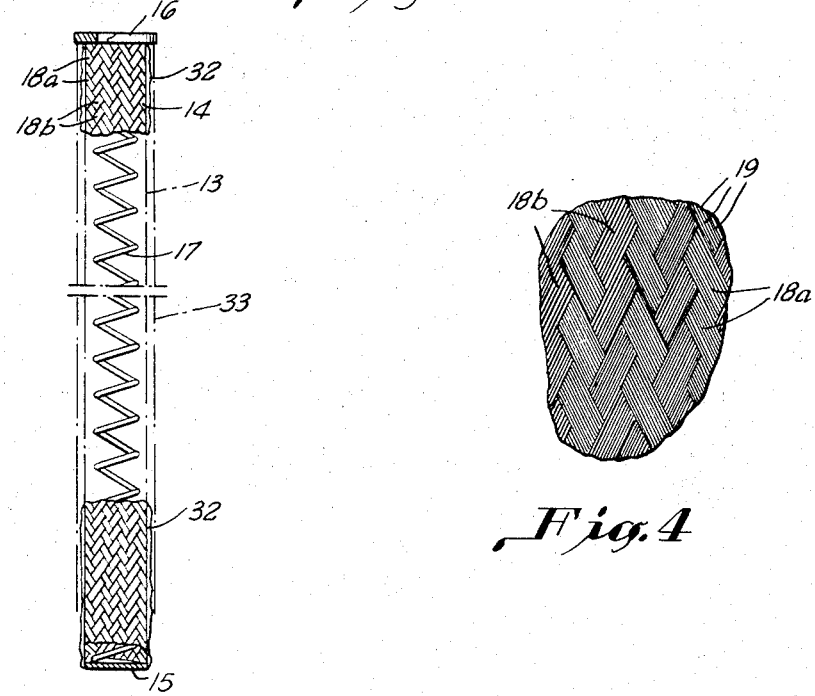
Figure 4:
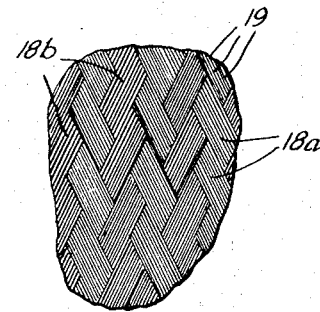

The invention will now be described in greater detail, by way of example, with reference to the accompanying drawings, in which:

FIGURE 1 is a schematic sectional view of one embodiment of a filter comprising filter units in accordance with the invention, FIGURE 2 is a section taken on the line II—II of FIGURE 1, FIGURE 3 is a sectional view, on an enlarged scale, of one of the filter units of the filter of FIGURES 1 and 2, and FIGURE 4 is an enlarged fragmentary side elevation of a portion of the filtering wall of the filter unit of FIGURE 3.

The filter shown in the drawings comprises a container, generally designated by the numeral 1, having side walls 2–5, a bottom 6, and a removable cover 7. The container 1 is divided internally into upper and lower compartments 8 and 9 by a partition wall 10. An inlet pipe 11 for gas to be filtered is connected to the wall 2 near to the bottom of the container and an outlet pipe 12 for filtered gas is connected to the wall 4 near to the top of the container.

The partition wall 10 supports a plurality of tubular filter units 13 in the compartment 9. As shown in FIGURE 3, each filter unit 13 comprises a tubular filtering wall 14 which is closed at its lower end by a metal disc 15 and is secured to an annular plate 16 at its upper end. A helical spring 17 is mounted inside the filtering wall 14 and bears against the disc 15 at one end and against the plate 16 at its other end to exert an axial force on the filter unit tending to increase the length of the filtering wall.

The filtering wall 14 is constructed as described in British Patent No. 942,492 from helically disposed flexible wires providing between them filtering pores. Preferably the wires are woven with a basket weave in which a plurality of helically disposed groups 18a of wire, each group including a plurality, for example twelve, of parallel wires 19 of small diameter, for example 0.008 inch (0.2 mm.), are braided with other similar helically disposed groups 18b of wires in a plain or "over two—under two" weave. Examples of suitable materials for the wires are galvanised steel, stainless steel, copper, copper alloys, Monel (trademark) and aluminium. Alternatively, the filtering wall 14 may be woven from nonmetallic filaments, for example glass fibres.

The filter units 13 are mounted in apertures 20 in the partition wall 10 and are secured to the latter by a plate 21 which overlies the annular plates 16 of the filter units and is secured in any suitable way to the partition wall. The plate 21 is provided with apertures 22 aligned with the openings in the upper ends of the filter units.

Secured to the underside of the bottom 6 of the container 1 is a cylinder 23 with its longitudinal axis disposed substantially parallel to the longitudinal axes of the filter units 13. The cylinder 23 houses a piston 24, the piston rod 25 of which projects from the upper end of the cylinder 23 and through the bottom 6 of the container 1 into the compartment 9. Secured to the upper end of the piston rod 25 is a sheet metal plate 26 in which is pressed a plurality of shallow circular depressions 27 having a diameter slightly greater than the diameter of the lower ends of the filter units 13. The number of the depressions 27 is equal to the number of filter units 13 and the centre of each depression 27 lies on the longitudinal axis of a different one of the filter units 13. The lower end of the cylinder 23 is connected to a pipe 28 leading to one branch of a three-way valve 29. The other two branches of the valve 29 are connected to pipes 30 and 31. The pipes 30 and 31 serve, respectively, for the supply of working medium to, and its withdrawal from, the cylinder 23 for the purpose of moving the piston 24 between its lower position shown in full lines in FIGURE 1 and an upper position shown in chain lines. With the valve 29 set to connect pipe 28 to pipe 30, the piston 24 moves from its lower position to its upper position and raises the plate 26 so that the lower ends of the filter units 13 are received in the depressions 27 and then raised with the plate. This results in shortening of the filtering walls 14 in opposition to the thrust of the springs 17 until the plate 26 reaches its uppermost position indicated in chain lines and designated by the numeral 26a. If the valve 29 is now set to connect pipe 28 to pipe 29, the piston 24 is returned to its lower position.

In using the above described filter, gas to be filtered is supplied to the compartment 9 via the pipe 11 and filtered gas is withdrawn from the compartment 8 via pipe 12. Dust and other foreign matter in the gas is deposited on the outer surfaces of the filtering walls 14 and gradually accumulates to form layers 32 thereon as indicated in FIGURE 3.

When it is desired to remove the dust layers 32 from the filter units the plate 26 is raised from its lower position to its upper position 26a by means of the piston 24 in order to shorten the filtering walls 14. This causes a small increase in the diameter of the filtering walls, as indicated by the chain line 33 in FIGURE 3, and hence a small increase in the diameter of the layer 32. If now the plate 26 is returned to the position shown in full lines in FIGURE 1 the springs 17 restore the filter units 13 to their original length and the layers 32 fall away from the filter units on to the plate 26. During the shortening of the filter units 13 by the raising of the plate 26, the springs 17 assist in supporting the filtering walls 14. When the plate 26 is lowered, the coils of the springs 17 prevent any decrease in diameter of the filtering walls 14 to a size less than the diameter of the coils.

The dust and other foreign matter collected on the plate 26 may be discharged from the container 1 by opening the bottom 6, which for this purpose may be connected to the lower end of the side wall 2 by hinges 34.

Actuation of the piston 24 to effect cleaning of the filter units as described may be effected at predetermined intervals by an operator suitably adjusting the setting of valve 29.

Alternatively, the piston 24 may be actuated automatically in dependence on the pressure difference between the compartments 8 and 9. To this end a device 35 for measuring the pressure difference between the compartments 8 and 9 may be arranged to emit a signal when the pressure difference exceeds a predetermined value. This signal is supplied to any suitable servo-device 36 which effects actuation of the valve 29 in the desired manner.

In an alternative embodiment of the above described filter the raising and lowering of the plate 26 is controlled by electromagnetic means, for example a solenoid actuator, instead of by the piston and cylinder assembly 24, 23.

I claim:

1. A gas filter comprising a vertically elongated container, an inlet opening in the lower end of the container for admission of gas to be filtered, an outlet opening in the upper end of the container for the withdrawal of filtered gas, constraining means within the container constraining the gas to flow from the inlet opening to the outlet opening through a plurality of substantially identical filter units of the kind comprising a tubular filtering wall composed of helically disposed flexible filaments with some filaments running in one direction and other filaments running in another direction in crossing relation to the first mentioned filaments and providing between them filtering pores, at least some of the filaments being bodily movable relative to each other to cause a variation in the diameter of the filtering wall with a corresponding variation in the length of the filtering wall upon application of axially directed force to said filtering unit, and means for applying a substantially axially directed force to the filter units for the purpose of varying the length of the filtering wall, said container being divided into upper and lower compartments by said constraining means which means comprise a substantially horizontally disposed partition wall having a plurality of apertures therein, said inlet opening communicating with the lower compartment and said outlet opening communicating with the upper compartment, each filter unit being mounted in said partition and having one end of its filtering wall open and its other end closed, each filter unit having the open end of its filtering wall secured in a respective aperture in said partition wall with the longitudinal axis of the filtering wall disposed substantially vertically and the closed end of the filtering wall lowermost, a plurality of helical springs, each of said helical springs housed within a respective one of the filtering walls of each filter unit and arranged with the upper end of each spring bearing against said partition wall and the lower end of each said spring bearing against the closed end of its respective filter wall and exerting a downwardly directed thrust against the closed end of the respective filter unit, said means for applying axially directed force to each filter unit comprising means for raising the closed end of each filtering wall in opposition to the thrust exerted by its associated helical spring, said means for raising the closed end of each filtering wall including a substantially horizontally extending plate disposed in said housing and below the closed lower end of said filtering units, said plate being vertically movable into engagement with the closed end of each filtering wall, and power actuated means for effecting vertical movement of said plate, and means for initiating actuation of said power actuated means in response to the establishment of a predetermined difference in pressure between the gas in the upper and lower compartments of the container, said power-actuating means comprising a vertically movable piston and cylinder assembly disposed below said container, said piston being disposed within said cylinder, a three-way valve controlling the flow of fluid to and from said piston and cylinder assembly, a pressure responsive device responsive to the pressure difference between said compartments which device emits a signal when said pressure responsive to said signal which servo device actuates said valve to admit pressurized fluid to the underside of said piston when a signal is received from said pressure responsive device and which actuates said valve to stop the flow of pressurized fluid to the underside of said piston when a signal from said pressure responsive device is not received by said servo device for controlling actuation of said valve and a vertically extending piston rod attached at its lower end to said piston and at its upper end to substantially the center of said plate.

References Cited

UNITED STATES PATENTS

| 211,033 | 12/1878 | Martin | 55—288 |
|---|---|---|---|
| 1,153,751 | 9/1915 | Beth | 55—304 X |
| 1,757,834 | 5/1930 | Haegler | 55—304 |
| 1,928,670 | 10/1933 | McCrery | 55—304 X |
| 2,015,355 | 9/1935 | Snow et al. | 210—106 X |
| 2,350,011 | 5/1944 | Black | 55—283 |
| 2,460,084 | 1/1949 | Hebo | 210—356 |
| 2,503,568 | 4/1950 | Timm | 55—304 X |
| 2,534,600 | 12/1950 | Hutchings | 55—291 X |
| 2,594,417 | 4/1952 | Gerber | 55—305 X |
| 2,850,112 | 9/1958 | Dru | 55—341 X |
| 3,008,543 | 11/1961 | Bourdale et al. | 55—283 |
| 3,073,097 | 1/1963 | Hallett et al. | 55—283 |
| 3,100,190 | 8/1963 | Hobson | 210—356 X |
| 3,165,389 | 1/1965 | Vedder | 55—304 |
| 3,295,298 | 1/1967 | Mackey | 55—305 |

FOREIGN PATENTS

| 294,465 | 10/1916 | Germany. |
|---|---|---|
| 761,384 | 10/1952 | Germany. |
| 449,828 | 7/1936 | Great Britain. |

OTHER REFERENCES

Filtomor Engineering Bulletin 1000, PER Corporation Filtomor Division, P.O. Box 305, Orange, N.J. 07051, Received in Patent Office June 28, 1966, pages 1, 14, 15, 16, 17.

HARRY B. THORNTON, *Primary Examiner.*

D. TALBERT, *Assistant Examiner.*